United States Patent [19]

Ashihara et al.

[11] Patent Number: 4,965,149
[45] Date of Patent: Oct. 23, 1990

[54] METAL JACKET AND DRY CELL USING THE SAME

[75] Inventors: Ryohei Ashihara, Neyagawa; Kikumitsu Suehiro, Moriguchi; Masayuki Yabuta, Kurita; Hideaki Yamagishi, Takatsuki, all of Japan

[73] Assignee: Matsushita Electric Industrial Co., Ltd., Osaka, Japan

[21] Appl. No.: 321,746

[22] Filed: Mar. 10, 1989

[30] Foreign Application Priority Data

Mar. 10, 1988 [JP] Japan .................. 63-56652

[51] Int. Cl.⁵ .............................................. H01M 2/02
[52] U.S. Cl. ...................................... 429/168; 429/56; 429/176; 220/207
[58] Field of Search ................ 429/56, 53, 163, 176, 429/50, 168; 220/89 A, 89 R, 207, 266, 66

[56] References Cited

U.S. PATENT DOCUMENTS

| | | |
|---|---|---|
| 3,576,680 | 4/1971 | Watanabe et al. .............. 429/168 |
| 4,079,172 | 3/1978 | Potts et al. . |
| 4,227,701 | 10/1980 | Tsuchida et al. . |
| 4,484,691 | 11/1984 | Lees ........................ 429/56 X |
| 4,610,370 | 9/1986 | Patterson et al. ............. 220/207 |
| 4,698,282 | 10/1987 | Mantello ....................... 429/56 |
| 4,722,874 | 2/1988 | Marchak ........................ 429/56 |
| 4,789,608 | 12/1988 | Oswald ......................... 429/56 |

FOREIGN PATENT DOCUMENTS

| | | |
|---|---|---|
| 975894 | 12/1962 | Fed. Rep. of Germany . |
| 2146365 | 3/1973 | Fed. Rep. of Germany . |
| 1097049 | 6/1955 | France . |
| 53-133469 | 11/1978 | Japan . |
| 57-5261 | 1/1982 | Japan . |
| 61-19053 | 1/1986 | Japan . |

Primary Examiner—Anthony Skapars
Attorney, Agent, or Firm—Wenderoth, Lind & Ponack

[57] ABSTRACT

An outer metal jacket for a dry cell, prepared by butting a rectangular metal plate at both side edges and joining the butted part by welding or bonding to make a cylindrical body, characterized in that a part having smaller mechanical strength is integrally provided on at least one of the upper and lower rims of the cylindrical body as a safety mechanism. When the inner pressure is increased by any reason originated from an electrochemical cell system accommodated therein, the safety mechanism is opened outwardly and the increased pressure is reduced therethrough.

21 Claims, 6 Drawing Sheets

METAL JACKET AND DRY CELL USING THE SAME

FIELD OF THE INVENTION

The present invention relates to a metal jacket and a dry cell using the same. More particularly, it relates to an outer metal jacekt (or cladding) provided with a safety mechanism and a dry cell of high safety using the same for prevention from breakage or rupture.

BACKGROUND OF THE INVENTION

In recent years, cylindrical dry cells were changed from a paper jacket type to a metal jacket type, and their resistance to leakage and expansion was much improved and their cell performances were significantly enhanced.

An outer metal jacket for such dry cell is formed by joining a rectangular metal sheet member 1, as shown in FIG. 12 of the accompanying drawings, at both side edges 1a and 1b to make a cylindrical shape and folding its lower rim 1c inwardly. The plan view and the bottom view of the thus formed metal jacket 2 are shown in FIGS. 13 (A) and 13 (B), respectively. Into the outer metal jacket 2, various components for constituting an electrochemical cell system are incorporated, and ultimately the upper rim 1d is folded inwardly to make a dry cell, of which the inside is made air-tight.

For joining both side edges 1a and 1b of said plate 1, there are usually adopted a double-locking system wherein said edges are folded in a double layered or overlapped state, a butting system wherein said edges are butted against each other, etc. In addition, there is recently developed a laser-welding system which assures firm joining.

For comparison, a metal jacket 3 of the double-locking system and a metal jacket 4 of the laser-welding system are respectively shown in FIGS. 14 (A) and 14 (B), and a metal jacket 4 of the laser-welding system and a metal jacket 5 of the butting system are respectively shown in FIGS. 15 (A) and 15 (B). As understood from such comparison, the laser-welding system jacket 4 does not have any inward protrusion like the double-locking part 3a in the double-locking system jacket 3 and therefore can accommodate an electrochemical cell system with a zinc can having an outer diameter which is larger by the size ($\alpha$) of the double-locking part 3a than a cell with double-locking part. Thus, the laser-welding system jacket 4 makes it possible to provide a dry cell having a larger capacity. Also, the laser-welding system jacket 4 has a higher tensile strength in the radial direction than the butting system jacket 5, and therefore the former does not produce an opening at the butting part as seen in the latter even on excessive discharge.

When, however, a dry cell comprising a laser-welding system jacket firmly joined at the butting part is used improperly, for example, under charge or left at a high temperature such as 85° C. or more, the electrochemical cell system produces a gas so that the inner pressure increases causing the expansion of the dry cell. Since the tensile strength of the laser-welding system jacket in the radial direction is great, the expansion caused by the increase of the inner pressure takes place in the vertical direction thus producing such troubles as the disengagement of the seal plate which defines the cathode cap provided at the upper part of the dry cell and the spread of the depolarizer mix t the outside. As the result, the appliance incorporated with the dry cell will be heavily damaged, and serious accidents may happen in some cases.

Accordingly, it is a basic object of the present invention to provide an outer metal jacket provided with a safety mechanism so as to prevent a dry cell constructed therewith from its breakage or rupture due to the abnormal rise of its inner pressure. Another object of this invention is to provide a dry cell of high safety using said metal jacket. These and other objects of the invention will be apparent from the foregoing and subsequent descriptions.

DESCRIPTION OF THE INVENTION

According to this invention, there is provided an outer metal jacket formed by joining a rectangular metal sheet member at both side edges, characterized in that it is integrally provided with a mechanically weaker part as a safety mechanism at the upper or lower rim in comparison with any other part of the metal jacket.

The metal jacket may be formed by butting a rectangular metal sheet member at both side edges and seaming the butted part by welding such as laser welding or fusion welding or bonding with a bonding agent.

The mechanically weaker part (i.e. the part having a smaller mechanical strength) which defines the safety mechanism may be provided on the upper and/or lower rim(s) of the metal jacket in various ways. An example of the ways is to provide a notch portion, e.g. in a wedge shape, on at least one of the upper and lower rims at the position corresponding to the butted part and a cutout notch on the same rim where said notch portion is provided so as to make the part between the notch portion and the cutout notch weaker in mechanical strength in comparison with any other part. Instead of said notch portion, a cutout notch may be provided at any other part on the rim; namely, in this case, two or more cutout notches are provided on at least one of the upper and lower rims.

Another example is to provide a notch portion on at least one of the upper and lower rims at the position corresponding to the butted part corresponding to the butted part and a narrow score on the same rim where said notch portion is provided so as to make the part between the notch portion and the score weaker in mechanical strength in comparison with any other part. Instead of said notch portion, a score may be provided at any other part on the rim; namely, in this case, two or more scores are provided on at least one of the upper and lower rims.

In the above examples, a notch or score may be provided continuously with a score or notch; namely, a notch and a score may be provided in combination.

For construction of a dry cell, a sealed cell system is incorporated into the metal jacket, followed by clamping the upper and lower rims of the metal jacket inwardly. In a preferred embodiment, the opening angle between the notch portion in a wedge shape and the notch adjacent thereto or between two notches adjacent to each other may be kept within 90° so that the part between them as the safety mechanism will be opened outwardly on the abnormal increase of the inner pressure in the dry cell.

Since the outer metal jacket of the invention is provided with the safety mechanism as above, the abnormal rise of the inner pressure in the dry cell manufactured by the use of such metal jacket due to its improper use causes the safety mechanism to open, thereby resulting in reduction of the inner pressure, whereby breakage or rupture of the dry cell with disengagement of its seal plate which defines the cathode cap and spread of the depolarizer mix can be prevented.

BRIEF DESCRIPTION OF THE DRAWINGS

The present invention will become more apparent from the following description when considered with the accompanying drawings wherein.

DETAILED DESCRIPTION OF THE DRAWINGS

Figure 1:
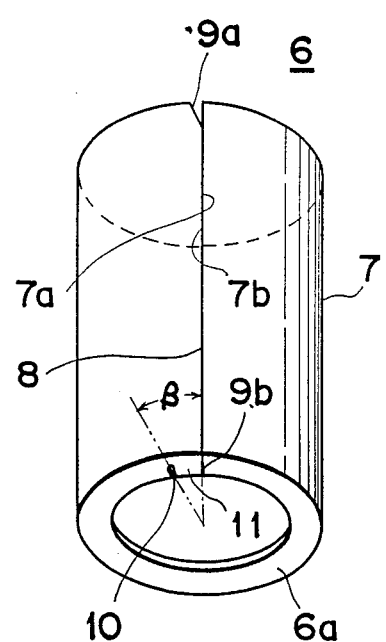
FIG. 1 is a perspective view of an outer metal jacket as an embodiment of the invention.
Figure 3:
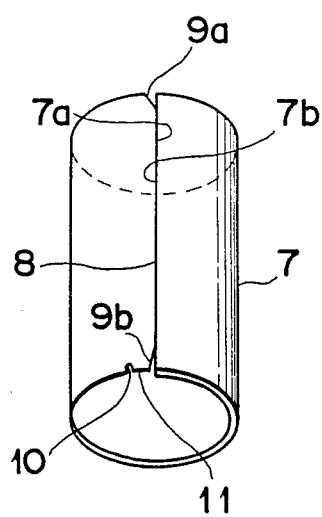
FIG. 3 is a perspective view of a metal sheet member butted and joined at both side edges for formation of an outer metal jacket as an embodiment of the invention.

In FIG. 1, there is shown an outer metal jacket 6 as an embodiment of the invention, usable for construction of a dry cell. The metal jacket 6 is made up by forming a rectangular metal sheet member 7 as shown in FIG. 2 (A) into a cylindrical shape, butting both side edges 7a and 7b and welding the butted part 8 by $CO_2$ laser to make a cylindrical body, of which the lower rim is then folded inwardly to make an annular bottom 6a.

Figure 2A:
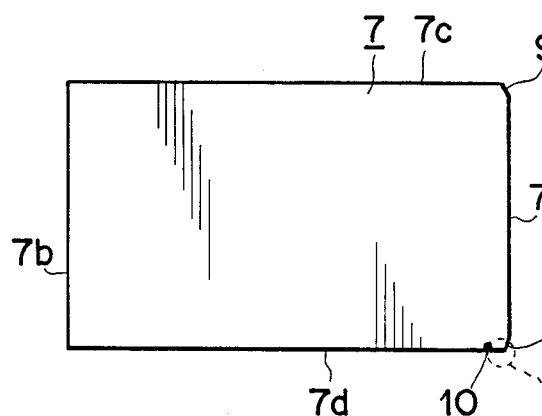
FIG. 2 (A) is a plan view of a metal sheet member for formation of an outer metal jacket as an embodiment of the invention, and FIG. 2 (B) is an enlarged plan view of the lower and right side part of said metal sheet member.
Figure 2B:
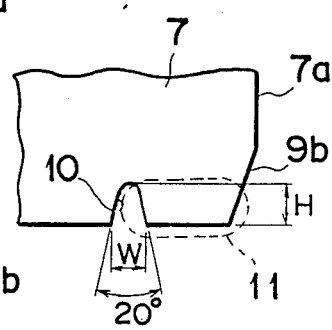

The rectangular metal sheet member 7 as shown in FIG. 2 is obtained by cutting or press cutting a metal sheet member. Then, its corner portions at the crossings of the side edge 7a with the upper edge 7c and with the lower edge 7d are cut off by a cutter to form notch portions 9a and 9b. Further, a notch 10 is formed by a cutter at a pre-determined position of the lower edge 7d near the notch portion 9b, i.e. near the crossing of the lower edge 7d with the side edge 7a or 7b. The notch 10 may have any appropriate shape such as V-letter shape, U-letter shape or semi-round shape and preferably takes such a shape having a height (H) of about 1.5 mm, a width (W) of about 1.4 mm and an opening angle (from the inside to the outside) of about 20° as shown in FIG. 2 (B), in which the part between the notch portion 9b and the notch 10 encompassed by a dotted line has a smaller mechanical strength in comparison with any other part on the lower edge 7d and serves as a safety mechanism.

For manufacture of the metal jacket 6, the side edges 7a and 7b of the metal sheet member 7 are joined together by any conventional procedure. The most typical joining procedure is welding, such as fusion welding or pressure welding. Among various fusion welding processes, laser welding is favorable, because the butted portion does not substantially form any inward protuberance so that an electrochemical cell system to be incorporated therein can have a larger diameter and consequently have a larger capacity. Joining may be accomplished also by bonding with any bonding agent.

Figure 4A:
FIGS. 4 (A), 4 (B) and 4 (C) show enlarged section views of the butted part of a metal sheet member as butted in different ways.
Figure 4B:
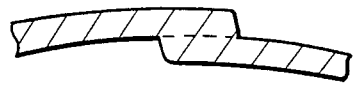
Figure 4C:
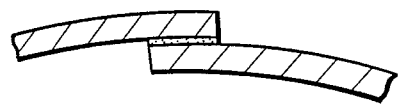

The butted portion 8 joined by various procedures is shown with enlarged in FIG. 4. FIGS. 4 (A), 4 (B) and 4 (C) show, respectively, the butted portions joined by laser welding, pressure welding and bonding with a bonding agent. The butted portion 8 thus joined has great joint strength and high air-tightness in comparison with joining by a double-locking system or a butting system. Therefore, a dry cell with an outer metal jacket joined by welding or bonding does not produce leakage of the electrolyte and is of high quality.

Explaining the safety mechanism according to this invention, it may be constituted by the part between the notch portion 9b and the notch 10, which is integrally formed on the annular bottom 6a of the metal jacket 6 (see FIG. 1). The distance between the notch portion 9b and the notch 10 may be, for instance, about 1 cm when the metal jacket 6 is used for a dry cell of Unit I (i.e. LR 20 under IEC or L 90 under ANSI). Since the notch portion 9b and the notch 10 are provided on the same rim in a relatively close distance as understood above, the part between them has small mechanical strength in comparison with any other part. The opening angle (see ($\beta$) in FIG. 1) between the notch portion 9 and the notch 10 may be usually within about 90°, preferably from about 15° to 50°, so as to make the part between them smaller in mechanical strength than any other part and facilitate its opening to the outside on the rise of the inner pressure of the dry cell.

Figure 5:
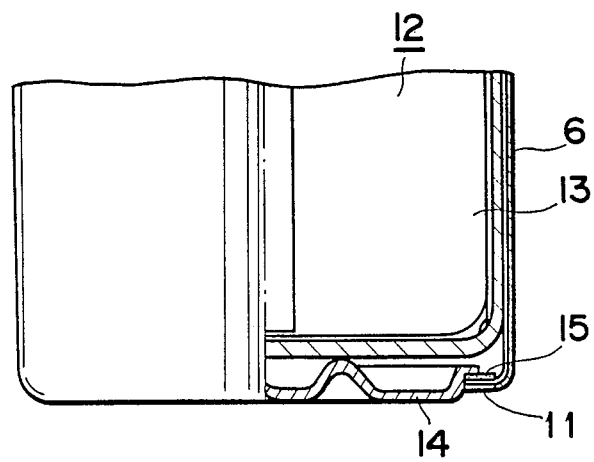
FIG. 5 is a fragmentary view partially cut away to show the lower inside of a dry cell using an outer metal jacket as an embodiment of the invention under proper use (i.e. in a state that the safety mechanism is not operated)

In FIG. 5, which is a fragmentary view partially cut away to show the inner structure of the lower part of a dry cell 12 accommodated in an outer metal jacket 6 provided with a safety mechanism 11, 13 is a Leclanche type cell element comprising a sealed manganese dioxide/zinc system, 14 is an anode terminal plate and 15 is a seal packing interposed between the metal jacket 6 and the terminal plate 14.

Upon proper use of the dry cell 12, the metal jacket 6 functions in a normal or ordinary manner as shown in FIG. 5. Thus, the dry cell 12 has the same clamping strength in the vertical direction as a conventional one, and no difference in storage performances and leakage resistance is not present between them.

Figure 6:
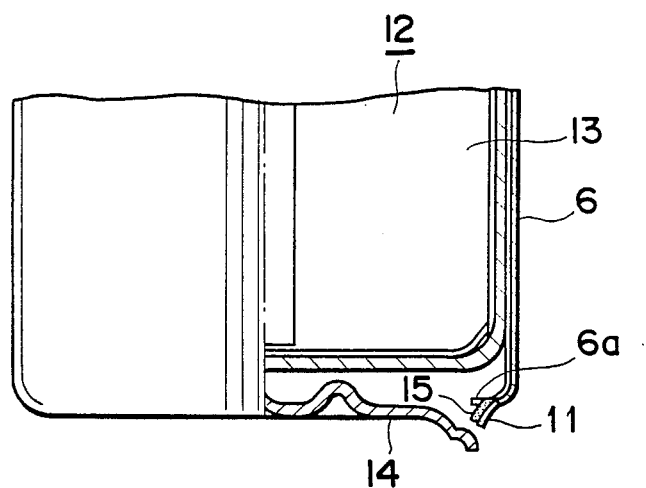
FIG. 6 is a fragmentary view partially cut away to show the lower inside of a dry cell using an outer metal jacket as an embodiment of the invention under improper use (i.e. in a state where the safety mechanism is operated)

When, however, the dry cell 12 is under improper use, gas may be generated from the electrochemical cell system in the metal jacket 6, and the inner pressure in the dry cell rises. As shown in FIG. 6, the mechanically weak part of the safety mechanism 11 on the annular bottom 6a is opened outwardly due to the generated gas, whereby the anode terminal plate 14 is partly separated from the annular bottom 6a at the position corresponding to the safety mechanism 11 to release the generated gas therethrough to the outside. As the result, the rise of the inner pressure in the dry cell 12 is prevented, and disengagement of the seal plate integrally forming a cathode cap and spread of the depolarizer mix to the outside can be inhibited.

Figure 7:
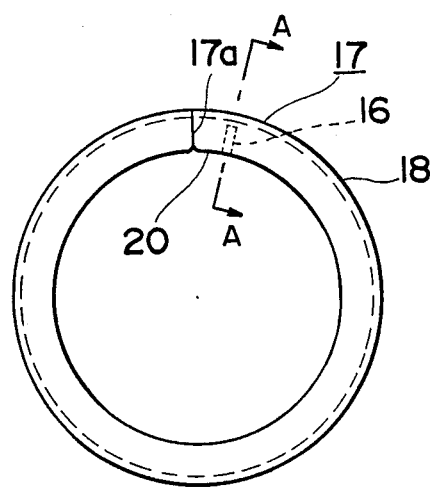
FIG. 7 is an explanatory bottom view of an outer metal jacket as an embodiment of the invention, of which the safety mechanism comprises a score.
Figure 8:
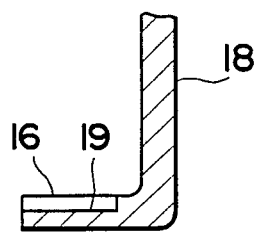
FIG. 8 is an enlarged section view taken along line A—A of FIG. 7.

In the above embodiments, the part between the notch portion 9 and the notch 10 having an opening angle of 90° or less is used as a safety mechanism 11. In place of said notch 10, a narrow score may be used. In FIGS. 7 and 8, there is shown an embodiment of an outer metal jacket 17 provided with a score 16. As shown in FIG. 8, a groove 19 is formed on the inside at the lower rim of a metal sheet member 18 to provide a score. The part between the score 16 and the notch portion 17a is smaller in mechanical strength than any other part and is thus available as a safety mechanism 20. In the metal jacket 17 provided with a safety mechanism of this kind, the cutout portion is not exposed to the outside so that the air-tightness of the dry cell on the proper use is kept well and the appearance can be improved.

Figure 9:
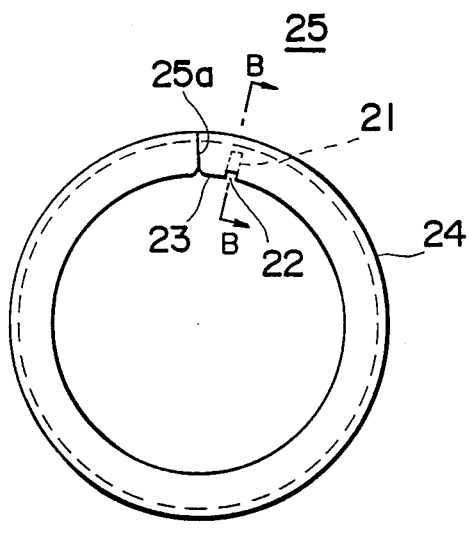
FIG. 9 is an explanatory bottom view of an outer metal jacket as an embodiment of the invention, of which the safety mechanism comprises a continuous score and notch.
Figure 10:
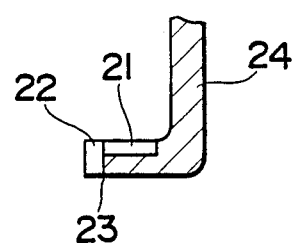
FIG. 10 is an enlarged section view taken along line B—B of FIG. 9.

As shown in FIGS. 9 and 10, the score 21 and the notch 22 may be formed continuously to provide a safety mechanism 23. When the safety mechanism is thus constructed, the rise of the inner pressure in the dry cell produces stress concentration onto the notch so that the outward folding of the safety mechanism 23 (resulting in cutting of the score portion 16) is more assured than that of the safety mechanism 20 constituted with the score 16 alone as shown in FIG. 7, and the safety of the dry cell can be enhanced.

Figure 11:
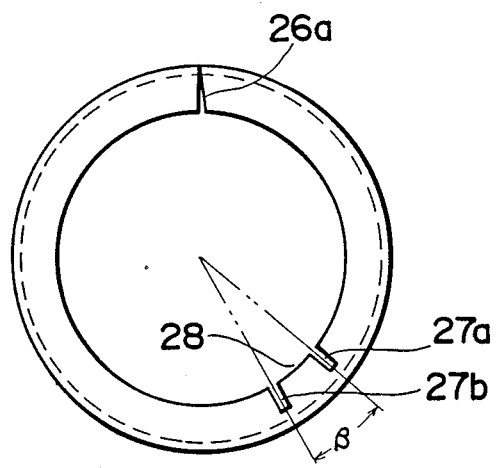
FIG. 11 is an explanatory bottom view of an outer metal jacket as an embodiment of the invention, of which the safety mechanism comprises a plural number of notches.
Figure 12:
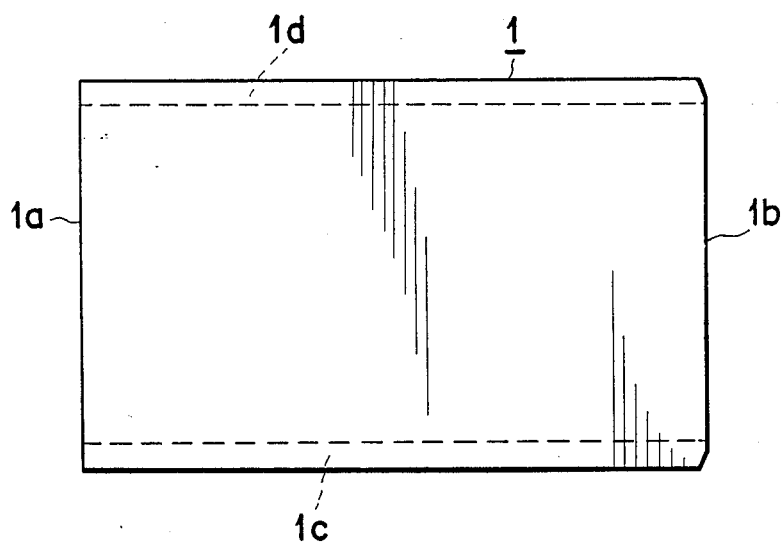
FIG. 12 is a plan view of a metal sheet member for forming a conventional outer metal jacket.
Figure 13A:
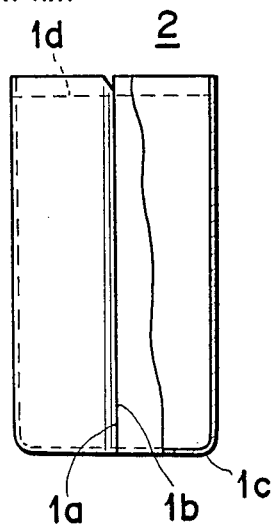
FIGS. 13 (A) and 13 (B) are respectively explanatory plan and bottom views of a conventional outer metal jacket.
Figure 13B:
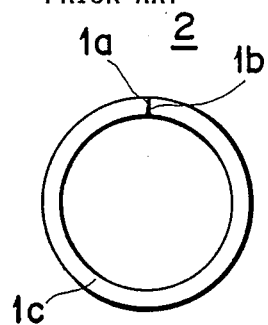
Figure 14A:
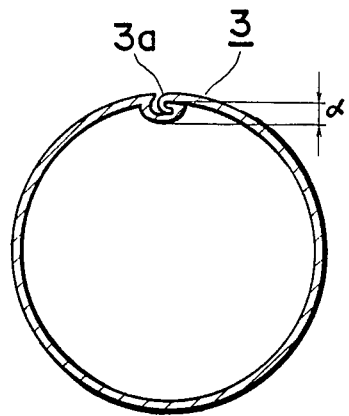
FIGS. 14 (A) and 14 (B) are respectively explanatory views of a double-locking jacket system and a laser-welding jacket system.
Figure 14B:
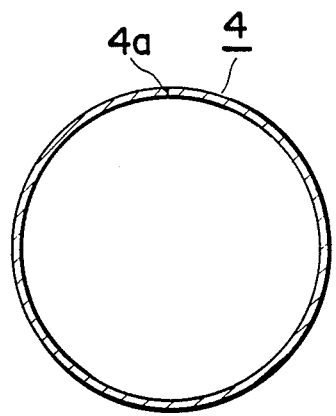
Figure 15A:
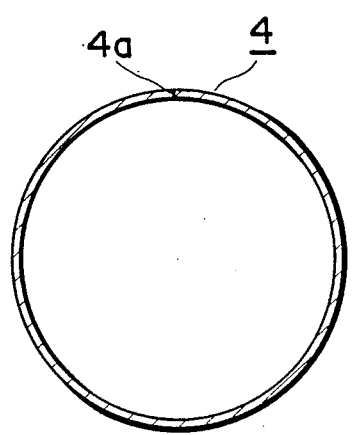
FIGS. 15 (A) and 15 (B) are respectively explanatory views of a laser-welding system jacket and a butting jacket system.
Figure 15B:
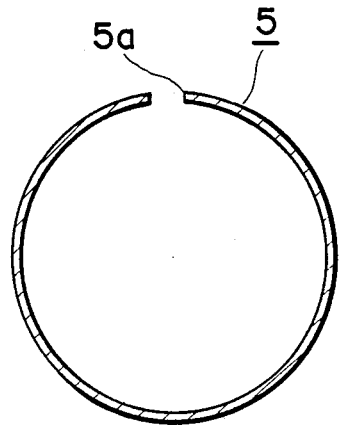

In the above embodiments, the safety mechanisms 11, 20 and 23 are respectively formed near the notch portions 9b, 17a and 25a on the lower rims of the metal plates 7, 18 and 24. However, this invention is not necessarily limited thereto, and a safety mechanism may be provided on the upper rims of the metal plates 7, 18 and 24. If desired, the safety mechanisms may be provided not on either one of the lower and upper rims but on both of them. Further, the combination is not necessarily limited to the one between the notch portion 9b, 17a or 25a and the notch 10 or 22 or the score 16 or 21, and as shown in FIG. 11, a plural number of notches or scores such as the notches 27a and 27b may be formed with an opening angle ($\beta$) of 90° or less at different positions from the notch portion 26a corresponding to the butted part to make a safety mechanism 28.

The invention has been explained hereinabove with respect to the metal jacket formed by seaming the metal sheet member 7, 18 or 24 at both side edges, for instance, by laser welding. However, this invention is not limited thereto and may be applied to any outer metal jacket as prepared by any other method. For instance, notches or scores as the safety mechanism may be provided on a seamless metal jacket formed by drawing.

As understood from the above, a dry cell prepared by the use of an outer metal jacket according to the invention can maintain high air-tightness on its proper use and surely prevent leakage of the electrolyte. On its improper use, for instance, gas may be generated causing expansion, but in such case, the safety mechanism having small mechanical strength is folded outwardly and the gas is released to the outside therethrough. Accordingly, the reliability and safety of a dry cell can be increased upon both proper use and improper use.

What is claimed is:

1. An outer metal jacket for surrounding an inner housing of a dry cell, comprising:
    upper and lower ring-shaped rims; and
    a safety mechanism comprising a part of at least one of said upper and lower rims which has a smaller mechanical strength than any other part on the same respective one of said at least one of said upper and lower rims.

2. The jacket according to claim 1, wherein
    said part of said safety mechanism is formed between two notches formed in said at least one of said upper and lower rims.

3. The jacket according to claim 1, wherein
    said part of said safety mechanism is formed between a notch and a score formed in said at least one of said upper and lower rims.

4. The jacket according to claim 1, wherein
    said part of said safety mechanism is formed between two sources formed in said at least one of said upper and lower rims.

5. The jacket according to claim 1, wherein
    said part of said safety mechanism is formed between a score having a notch formed therealong and a second notch formed in said at least one of said upper and lower rims.

6. The jacket according to claim 1, comprising
    a metal sheet member having two side edges mutually butted together by welding or bonding.

7. The jacket according to claim 6, wherein
    said part of said safety mechanism is formed between two notches formed in said at least one of said upper and lower rims.

8. The jacket according to claim 7, wherein
    one of said notches is formed at the location where said two side edges are butted together.

9. The jacket according to claim 6, wherein
    said part of said safety mechanism is formed between a notch and a score formed in said at least one of said upper and lower rims.

10. The jacket according to claim 9, wherein
    said notch is formed at the location where said two side edges are butted together.

11. The jacket according to claim 6, wherein
    said part of said safety mechanism is formed between two scores formed in said at least one of said upper and lower rims.

12. The jacket according to claim 6, wherein
    said part of said safety mechanism is formed between a score having a notch formed therealong and a second notched formed in said at least one of said upper and lower rims.

13. A dry cell comprising:
    an inner housing; and an outer metal jacket surrounding said inner housing and including upper and lower ring-shaped rims, and a safety mechanism comprising a part of at least one of said upper and lower rims which has a smaller mechanical strength than any other part on the same respective one of said at least one of said upper and lower rims.

14. The dry cell according to claim 13, further comprising an electrochemical cell system sealed within said inner housing.

15. The dry cell according to claim 14, wherein said outer metal jacket is cylindrical and comprises a metal sheet member having two side edges mutually butted together.

16. The dry cell according to claim 15, wherein said part of said safety mechanism is formed between two notches formed in said at least one of said upper and lower rims.

17. The dry cell according to claim 16, wherein one of said notches is formed at the location where said two side edges are butted together.

18. The dry cell according to claim 17, wherein said notches are circumferentially offset from one another by less than 90°.

19. The dry cell according to claim 15, wherein said two side edges are mutually butted together by a laser-weld.

20. The dry cell according to claim 14, wherein said part of said safety mechanism is integral with said lower rim of the outer metal jacket.

21. The dry cell according to claim 20, further comprising an anode terminal plate in contact with the bottom face of said electrochemical cell system and having a circumferential rim; and a seal packing inserted between said lower rim and said circumferential rim.

* * * * *